(12) United States Patent
Ooba

(10) Patent No.: US 8,199,239 B2
(45) Date of Patent: Jun. 12, 2012

(54) VIDEO DISPLAY DEVICE, IMAGING APPARATUS, AND METHOD FOR VIDEO DISPLAY

(75) Inventor: Yuuji Ooba, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 12/618,844

(22) Filed: Nov. 16, 2009

(65) Prior Publication Data

US 2010/0123803 A1 May 20, 2010

(30) Foreign Application Priority Data

Nov. 18, 2008 (JP) ................. P2008-294879

(51) Int. Cl.
*H04N 5/222* (2006.01)
(52) U.S. Cl. .................... 348/333.01; 348/333.02
(58) Field of Classification Search ........... 348/333.01, 348/333.02
See application file for complete search history.

(56) References Cited

U.S. PATENT DOCUMENTS

| 7,271,838 | B2 * | 9/2007 | Suekane et al. | 348/333.02 |
|---|---|---|---|---|
| 7,417,671 | B2 * | 8/2008 | Sugimori | 348/223.1 |
| 7,649,564 | B2 * | 1/2010 | Suekane et al. | 348/333.02 |
| 2003/0103156 | A1 * | 6/2003 | Brake et al. | 348/333.01 |
| 2007/0126907 | A1 * | 6/2007 | Stueckler | 348/333.01 |
| 2007/0291152 | A1 * | 12/2007 | Suekane et al. | 348/333.02 |
| 2009/0303375 | A1 * | 12/2009 | Ohyama | 348/333.12 |

FOREIGN PATENT DOCUMENTS

| JP | 2 194793 | 8/1990 |
|---|---|---|
| JP | 7 274190 | 10/1995 |
| JP | 9 154049 | 6/1997 |
| JP | 11 284872 | 10/1999 |
| JP | 2004 147229 | 5/2004 |
| JP | 2006 67044 | 3/2006 |
| JP | 2006 165716 | 6/2006 |

* cited by examiner

*Primary Examiner* — Kelly L Jerabek
(74) *Attorney, Agent, or Firm* — Frommer Lawrence & Haug LLP; William S. Frommer; Thomas F. Presson

(57) ABSTRACT

A video display device includes a brightness range specifying unit configured to specify a range of brightness values for highlight, a signal processing unit configured to detect signals relevant to an area other than an area in the brightness range specified by the brightness range specifying unit from input video signals, suppress color components of the detected signals, and not suppress color components of signals relevant to the area in the specified brightness range, and a display unit configured to display video based on the video signals processed by the signal processing unit, the unit being capable of performing color display.

5 Claims, 5 Drawing Sheets (PRIOR ART)

VIDEO DISPLAY DEVICE, IMAGING APPARATUS, AND METHOD FOR VIDEO DISPLAY

BACKGROUND OF THE INVENTION

1. Field of the Invention

The present invention relates to a video display device suitably applied to an electronic viewfinder that displays video obtained by image capture through, for example, an imaging apparatus, an imaging apparatus including the video display device, and a method for allowing the video display device to display video.

2. Description of the Related Art

Imaging apparatuses (video cameras) for broadcast stations or business purposes are designed so that various imaging condition adjustments, such as focusing adjustment and brightness level adjustment, can be performed manually in order to increase the flexibility of video expression. Enabling the manual adjustments allows for image capture reflecting the purpose of a producer or an operator who performs shooting works.

The operator, who performs shooting works, views video displayed on an electronic viewfinder of such a video camera to check whether intended video is captured. Recent electronic viewfinders typically include a color display device for displaying color video.

One of items which the operator checks while viewing video displayed on the electronic viewfinder is a brightness level adjustment state.

Some of electronic viewfinders can provide a display mode in which a portion having a specific brightness level is identified in captured video upon brightness level adjustment.

For example, assuming that a display mode for indicating a portion having a brightness level near 50% is set, an area corresponding to the portion having a brightness level near 50% is detected from video signals obtained by image capture and the detected area is indicated such that a stripe pattern called a zebra pattern is added to the area.

The electronic viewfinder performs the above-described display and the operator checks the area with the stripe pattern. Thus, the operator can easily determine to which brightness level the video camera is adjusted for image capture.

In capturing an image of a person, for example, when the operator intends to perform brightness level adjustment so that a skin color area has a brightness level of 50%, the operator checks an adjustment state in which the zebra pattern is added to a skin color portion. Thus, the operator can perform this brightness level adjustment.

FIG. 6 illustrates a display example in which a zebra pattern Z is added to a skin color portion of a captured image of a person so that the skin color portion has a target brightness level.

Japanese Unexamined Patent Application Publication No. 2006-165716 discloses an example in which a zebra pattern is added to a high-brightness area in video captured by an imaging apparatus.

SUMMARY OF THE INVENTION

When a zebra pattern is added to captured video itself, the stripe pattern is added to a target brightness area. Disadvantageously, it is difficult to check a video segment corresponding to the area in the video displayed on an electronic viewfinder. Accordingly, even when a user intends to perform focusing adjustment so that the target brightness area is in focus, it is difficult to perform accurate focusing adjustment.

For example, when imaging conditions are adjusted so that the above-described skin color area has a brightness level of 50% and it is further necessary to accurately focus on the skin color portion, it is difficult to perform focusing adjustment because the stripe pattern obstructs focusing.

As for a setting operation for zebra pattern addition in such a type of related-art vide camera, it is necessary to display a menu screen in the electronic viewfinder and operate the menu screen. For operating the menu screen, relatively many operating steps have to be performed until a necessary operating step is performed. Specifically, it is necessary to set a brightness level for zebra pattern addition so that the zebra pattern is added to a portion having the set brightness level. Accordingly, it is difficult to easily perform an operation of changing the brightness level for zebra pattern addition.

In the case where brightness level adjustment is performed while the zebra pattern is added to a portion, therefore, it is difficult to change the brightness level for zebra pattern addition. Disadvantageously, the ease of operation is not good.

It is desirable that an area having a specific brightness level can be indicated favorably in video which is being captured so that the indication does not obstruct the video.

According to an embodiment of the present invention, brightness range specification processing of specifying a range of brightness values for highlight is performed.

Subsequently, signal processing of detecting signals relevant to an area other than an area in the brightness range specified by the brightness range specification processing from input video signals to suppress color components of the detected signals and not suppress color components of signals relevant to the area in the specified brightness range is performed.

In addition, video based on the video signals processed by the signal processing is displayed by a display unit capable of performing color display.

With the above-described signal process, only the area in the specified range of brightness values is displayed in color based on the original input video signals. As for the other area than the area in the specified range of brightness values, since the color components of the other area are suppressed, the other area is displayed with no colors (or pale colors) corresponding to suppressed levels.

According to the embodiment of the present invention, only the area in the specified range of brightness values is displayed in color based on the original input video signals. Thus, which portion is relevant to the specified range of brightness values can be easily determined in displayed video. Furthermore, the area in the specified range of brightness values is distinguished from the other area by the presence or absence of color. To distinguish the two areas, an extra is not superimposed on displayed video. Thus, any portion of the video can be easily viewed.

Accordingly, for example, the brightness value of the area in the specified range of brightness values can be easily set to a specified level and the area having the specified level can be easily focused on in the displayed video.

DESCRIPTION OF THE PREFERRED EMBODIMENTS

Embodiments of the present invention will be described in the following order:

1. Exemplary Configuration of Imaging Apparatus (FIG. 1);
2. Exemplary Configuration and Operation of Electronic Viewfinder (FIGS. 2 and 3);
3. Display Examples (FIGS. 4 and 5); and
4. Modifications.

1. Exemplary Configuration of Imaging Apparatus

Figure 1:
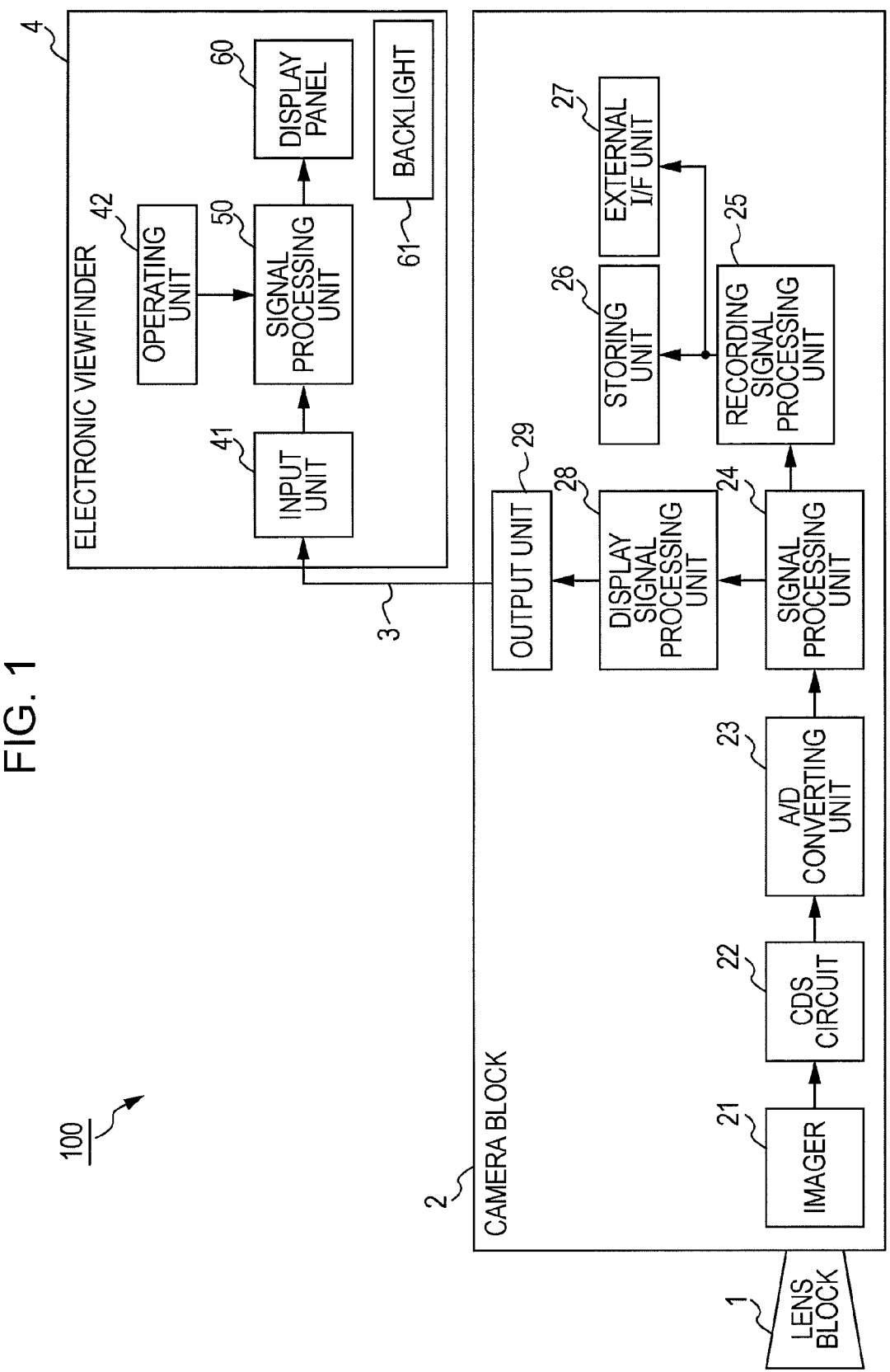
FIG. 1 is a block diagram illustrating an exemplary configuration of an imaging apparatus according to an embodiment of the present invention.

FIG. 1 illustrates an internal exemplary configuration of an imaging apparatus according to an embodiment of the present invention. Referring to FIG. 1, the imaging apparatus, indicated at 100, includes a lens block 1 that takes subject light into the imaging apparatus 100, a camera block 2, and an electronic viewfinder 4. In this embodiment, the electronic viewfinder 4 is configured to be detachable from the camera block 2.

The lens block 1 includes lenses for image capture and further includes a focusing ring (not shown) for adjusting the position of a lens for focusing adjustment and an iris mechanism (not illustrated) for adjusting an aperture size.

The camera block 2 includes an imager 21 that photoelectrically converts the subject light entering through the lenses of the lens block 1 to generate a video signal. The video signal generated by the imager 21 is supplied to a correlated double sampling circuit (hereinafter, referred to as a "CDS circuit") 22. The CDS circuit 22 removes reset noise included in the video signal generated by the imager 21 and supplies the resultant video signal to an analog-to-digital (A/D) converting unit 23.

The A/D converting unit 23 converts the video signal supplied from the CDS circuit 22 into a digital signal and supplies the digital signal to a signal processing unit 24. The signal processing unit 24 performs signal processing, such as feedback clamp processing for fixing a black level at a predetermined reference value and gamma correction, on the input video signal and outputs the resultant signal to each of a recording signal processing unit 25 and a display signal processing unit 28.

The signal processing unit 24 can also perform brightness level adjustment.

The recording signal processing unit 25 compresses the video signal processed by the signal processing unit 24 using a method, such as Moving Picture Experts Group (MPEG), and supplies the resultant signal to each of a storing unit 26 and an external interface (I/F) unit 27. The storing unit 26 includes a hard disk drive (HDD) and stores video signals compressed by the recording signal processing unit 25. The video signals stored in the storing unit 26 are not limited to compressed signals. Uncompressed video signals may be stored in the storing unit 26.

The display signal processing unit 28 processes the supplied video signal so that the signal is suitable for display on the electronic viewfinder 4. Specifically, the display signal processing unit 28 encodes the video signal processed by the signal processing unit 24 into a video signal in NTSC form or HD signal form. The NTSC form is an abbreviation of the National Television System Committee form. The HD signal form is an abbreviation of the High Definition signal form. The display signal processing unit 28 converts the encoded video signal into an analog signal. An output unit 29 outputs the resultant analog signal to the outside. The display signal processing unit 28 may perform signal processing, e.g., edge enhancement on the signal so that the signal is suitable for finder display.

The output unit 29 is an output unit for connection to the electronic viewfinder 4. In the present embodiment, the output unit 29 is connected to an input unit 41 of the electronic viewfinder 4 via a signal cable 3. In the present embodiment, an analog video signal is transmitted as color difference signals Pr and Pb and a luminance signal Y which are separate from one another through the signal cable 3.

In the electronic viewfinder 4, the video signal supplied to the input unit 41 is supplied to a signal processing unit 50 in which the video signal is subjected to necessary signal processing. The resultant video signal is supplied to a liquid crystal display panel 60, thus displaying video. On the rear of the liquid crystal display panel 60, a backlight 61 is placed.

The electronic viewfinder 4 further includes an operating unit 42 for setting a signal processing condition in the signal processing unit 50. Various instructions can be given by operating operation buttons (not shown) of the operating unit 42.

A process based on brightness level setting as a feature of the present embodiment is performed in the signal processing unit 50 in accordance with an operation on the operating unit 42. The detailed configuration and state of the process will be described later.

2. Configuration and Operation of Electronic Viewfinder

The configuration of the electronic viewfinder 4 will be described below with reference to FIG. 2.

The input unit 41 includes an analog-to-digital converter (ADC) 45 which converts a video signal supplied to an input terminal 41a into digital data. In this case, the color difference signals Pr and Pb and the luminance signal Y transmitted separately are different digital data items.

The color difference signals Pr and Pb of the converted digital video data items are supplied to a selector switch 51. The selector switch 51 selects either one of a line which data passes through a signal processing system for performing indication based on brightness level specification, which will be described in the present embodiment, and a through-line 56 which data passes without passing through the signal processing system. The selection is performed on the basis of a mode set on the operating unit 42. In the following description, a mode for performing indication based on brightness level specification will be called a "brightness level check mode".

When the signal processing system for performing indication based on brightness level specification is selected by the selector switch 51, an output of the selector switch 51 is supplied to a gate unit 52. When the input color difference signals Pr and Pb relate to a brightness level out of a brightness level range specified by a level detecting unit 63, the gate unit 52 sets the color levels of the color difference signals Pr and Pb to zero, thus completely suppressing color components of a portion relevant to the color difference signals Pr and Pb. When the color difference signals Pr and Pb relate to a brightness level in the range specified by the level detecting unit 63, the gate unit 52 maintains the color levels of the color difference signals Pr and Pb as they are.

The level detecting unit 63 performs a process of detecting an area having a brightness level, specified by a level specifying unit 64, from the luminance signal Y converted through the ADC 45 in the input unit 41.

Brightness level specification by the level specifying unit 64 is based on an operation on the operating unit 42. The operating unit 42 includes, for example, the operation buttons arranged on the electronic viewfinder 4 and is configured so that a brightness level can be specified in 10% increments from 0% to 100%. When a brightness level is specified by an operation on the operating unit 42, the level specifying unit 64 specifies a range of ±5% for the specified brightness level.

For example, when a brightness level of 60% is specified by an operation on the operating unit 42, the level specifying unit 64 specifies brightness levels ranging from 55% to 65%. In this brightness level specification, the level detecting unit 63 detects whether an input video signal is relevant to an area having a brightness level within the range of 55% to 65%. When the input video signal is relevant to the area having the brightness level within the range of 55% to 65%, the color levels of the color difference signals of the video signal are maintained as they are. When the input video signal is relevant to a portion having a brightness level out of the range, the color levels of the color difference signals of the video signal are set to zero.

The color difference signals Pr and Pb processed through the gate unit 52 are supplied to an amplifying unit 53 which performs amplification on the signals to enhance the color levels of the signals. In the case where the color levels of the color difference signals are set to zero by the gate unit 52 disposed upstream of the amplifying unit 53, even when the amplifying unit 53 amplifies the color difference signals, the color levels of the signals are maintained at zero. In other words, the color levels of only the color difference signals relevant to the area having the brightness level specified by the level specifying unit 64 are amplified.

An output of the amplifying unit 53 is supplied to an adder 54 in which color difference components of a test signal pattern output from a test signal generating unit 58 are added to the output. The color difference signals output from the adder 54 are supplied to a selector switch 55. The selector switch 55 is turned on or off in accordance with an instruction from the operating unit 42 while being operatively associated with the selector switch 51 described above. When the brightness level check mode is set, the output of the adder 54 is supplied to an RGB converting unit 59 through the selector switch 55. When the brightness level check mode is not set, the selector switches 51 and 55 select the through-line 56.

The luminance signal Y of the digital video data items converted through the ADC 45 in the input unit 41 is supplied to the level detecting unit 63 as described above and is further supplied to an adder 57. The adder 57 adds a luminance component of the test signal pattern output from the test signal generating unit 58 to the luminance signal Y. When the mode for performing indication based on brightness level specification is not set, the addition by the adder 57 is not performed. An example of the test signal pattern output from the test signal generating unit 58 will be described below upon description of a display example.

The resultant luminance signal Y output from the adder 57 is supplied to the RGB converting unit 59.

The RGB converting unit 59 converts the supplied luminance signal Y and the color difference signals Pr and Pb into three primary color signals R, G, and B. The converted primary color signals R, G, and B are supplied to a display panel driving unit 62 which drives the liquid crystal display panel 60. The liquid crystal display panel 60 includes the backlight 61.

Figure 3:
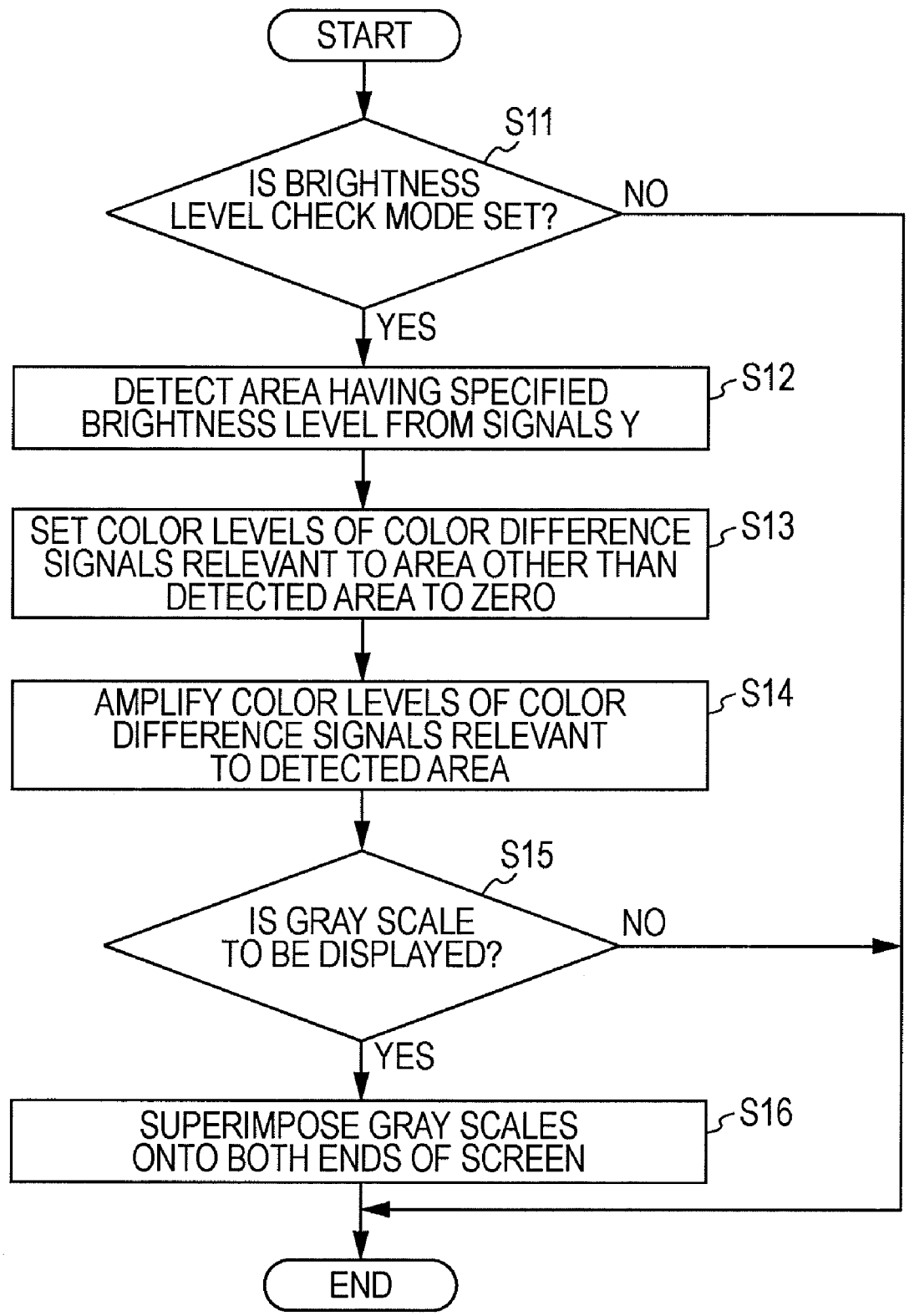
FIG. 3 is a flowchart of an exemplary process performed by the electronic viewfinder in the embodiment of the present invention.

FIG. 3 is a flowchart illustrating signal processing (hereinafter, referred to as a "process") performed when the brightness level check mode is set in the electronic viewfinder 4 in accordance with the present embodiment.

Figure 2:
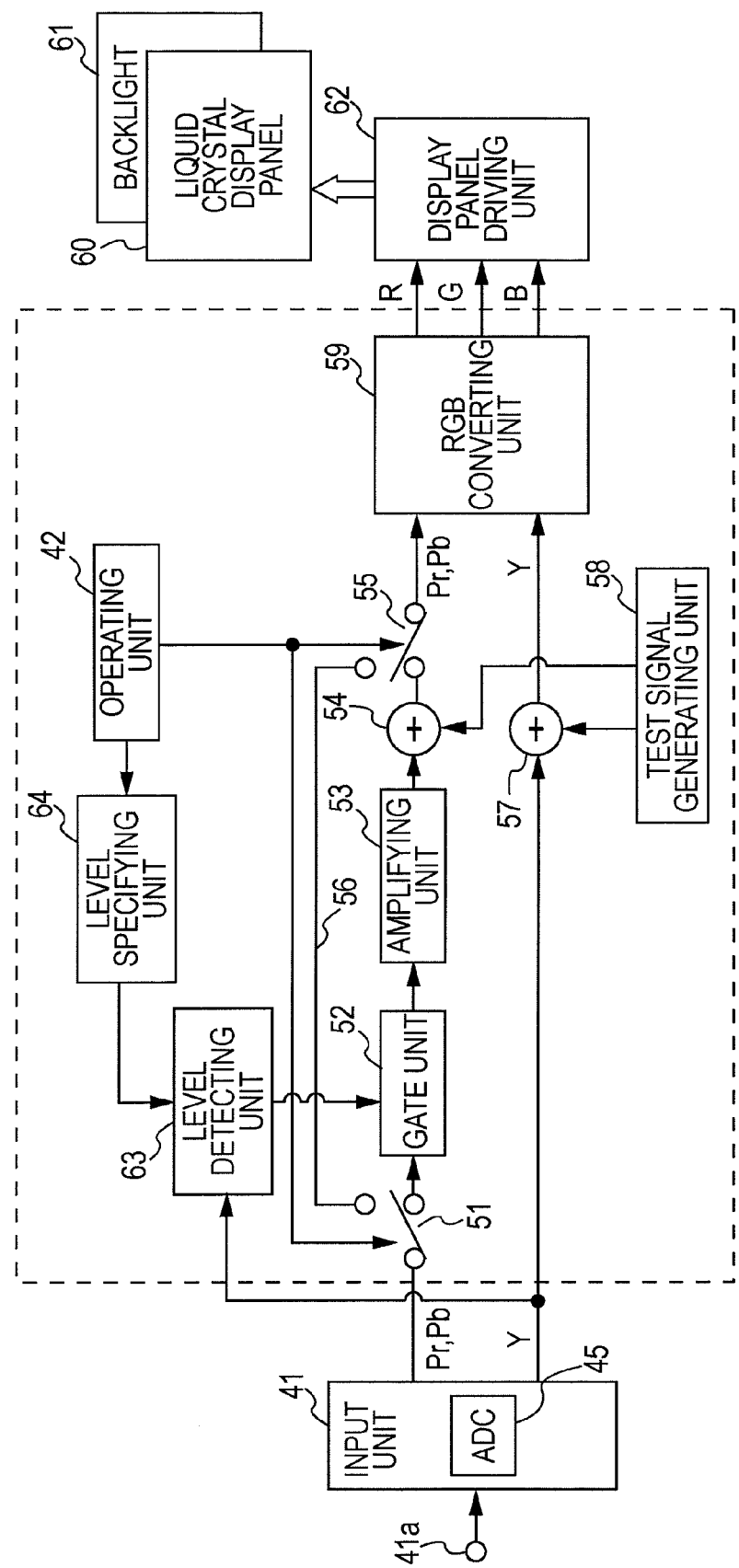
FIG. 2 is a block diagram illustrating an exemplary configuration of an electronic viewfinder provided for the imaging apparatus according to the embodiment of the present invention.

The process illustrated by the flowchart is implemented principally by the level specifying unit 64, the level detecting unit 63, and the gate unit 52 shown in FIG. 2.

Referring to FIG. 3, a determination is made as to whether the brightness level check mode is set in accordance with an operation on the operating unit 42 (step S11). If it is determined that the brightness level check mode is not set, the process illustrated by the flowchart of FIG. 3 is not implemented.

When it is determined that the brightness level check mode is set, an area having a specified brightness level is detected from luminance signals Y (step S12). Color suppression is performed so that the color levels of color difference signals relevant to an area other than the detected area are set to zero (step S13).

The color levels of the color difference signals relevant to the detected area are amplified by the amplifying unit 53 (step S14).

After that, a determination is made as to whether the set mode is a mode for test pattern display based on grayscale display (step S15). If it is determined that the set mode is the mode for test pattern display based on grayscale display, a test pattern is superimposed on video (screen) based on video signals by the adders 54 and 57 so that grayscales are displayed on both of right and left ends of the video (step S16).

3. Display Examples

Figure 4:
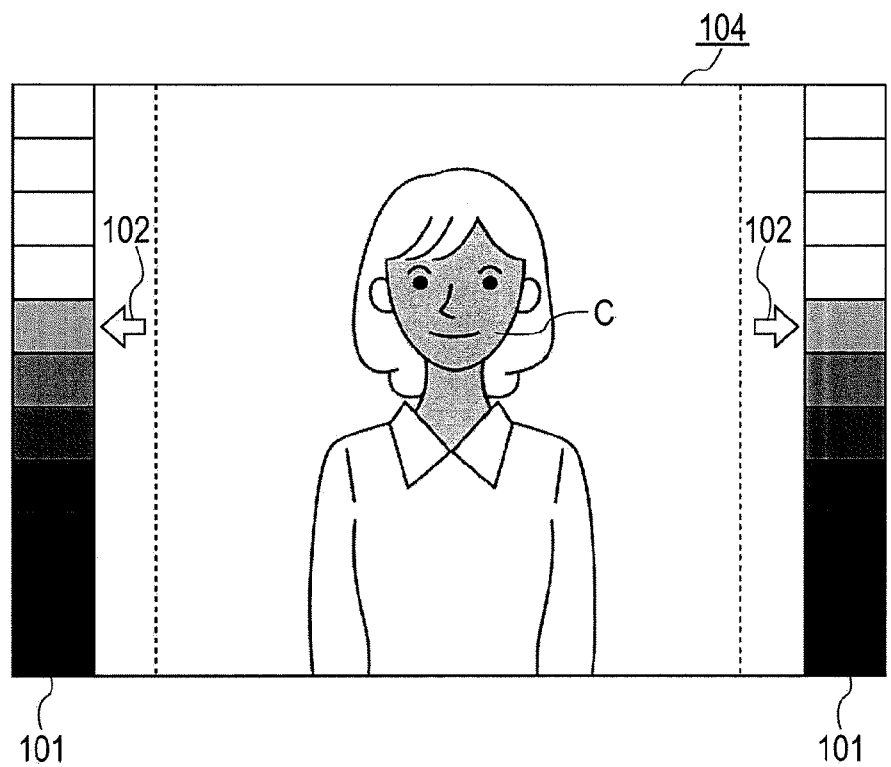
FIG. 4 is a diagram explaining a first example of display in accordance with the embodiment of the present invention.

FIG. 4 illustrates an example of display by the liquid crystal display panel 60 when the brightness level check mode is set in the present embodiment.

In this example, a grayscale 101 is displayed on each of right and left ends of a screen 104. Each grayscale 102 includes brightness levels in 10% decrements from 100% (white level) to 0% (black level) and is provided with a brightness level indicator 102, serving as an arrow, to indicate a brightness level which is checked in the current brightness level check mode.

Referring to FIG. 4, each brightness level indicator 102 indicates the fourth level from the top, namely, a brightness level of 60%.

When the brightness level of 60% is set, an area having a brightness level that is equal to or higher than 55% and is equal to or lower than 65% is detected from input video signals and video is displayed such that only the area is colored.

FIG. 4 illustrates the example in which a person is shot. It is assumed that a skin color portion of a face corresponds to the area having a brightness level that is equal to or higher than 55% and is equal to or lower than 65%. In this instance, as shown in FIG. 4, the area of the face is a colored portion C and the other area is displayed in black and white. When there is a portion having the same brightness level as that of the face, the portion is also colored.

In the present embodiment, since the amplifying unit 53 amplifies color components, the color is displayed so as to be enhanced as compared to the original color.

The display shown in FIG. 4 enables a user to determine which area has a brightness level near a specified brightness level, for example, a brightness level of 60%. When the user performs brightness level adjustment in the imaging apparatus 100, the user can easily adjust a brightness level to a target value. Furthermore, the range of the area having the brightness level near the specified level can be determined on the basis of the presence or absence of color. Accordingly, the user can also easily perform, for example, focusing on a target portion in the display on the electronic viewfinder 4.

Figure 5:
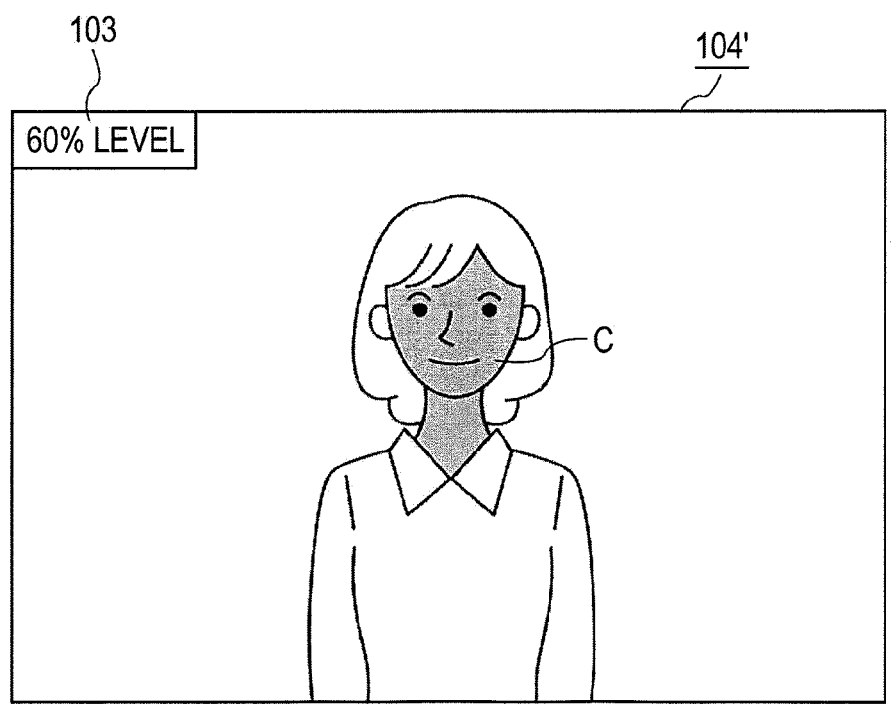
FIG. 5 is a diagram explaining a second example of display in accordance with the embodiment of the present invention.
Figure 6:
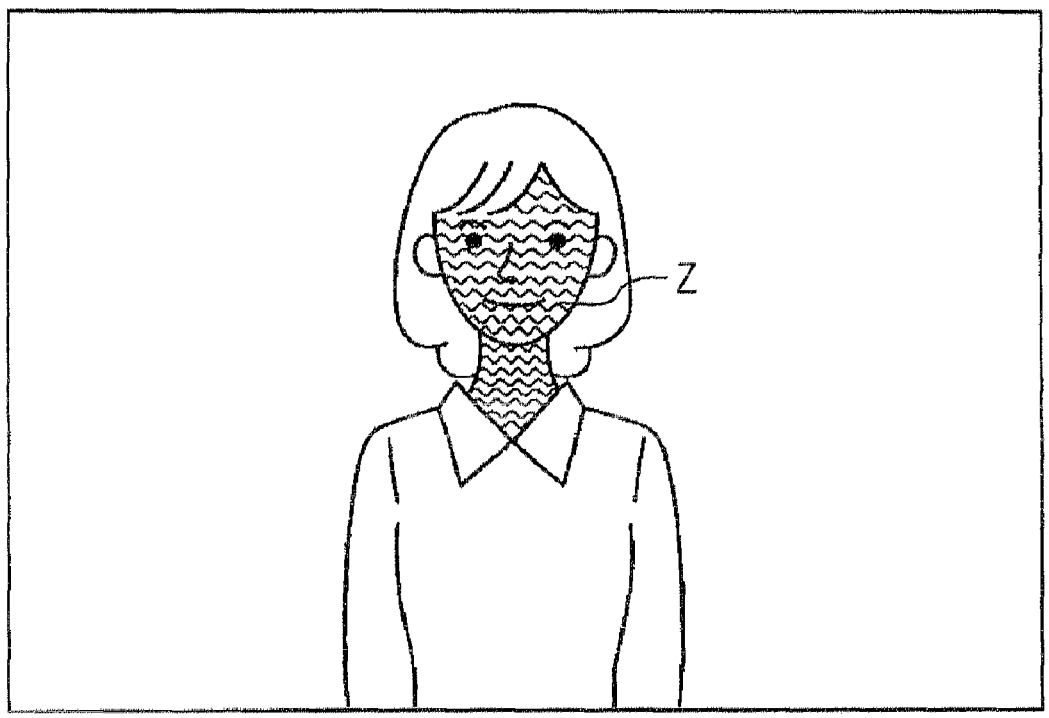
FIG. 6 is a diagram explaining an example of related-art display with a zebra pattern.

FIG. 5 illustrates another display example.

Referring to FIG. 5, brightness level numerical indication 103 including a character and a number is used instead of the arrows each indicating a level in the corresponding displayed grayscale shown in FIG. 4 such that the indication 103 is assigned to one end of a screen 104'. In this example, "60% LEVEL" is displayed. Alternatively, "LEVELS OF 55% TO 65%" indicating upper and lower limits may be displayed. The indication of a character and a number is performed in accordance with a corresponding signal output from, for example, the test signal generating unit 58 shown in FIG. 2.

Favorable indication can also be performed by directly indicating a brightness level using a number as described above.

4. Modifications

In the above-described embodiment, the amplifying unit 53 amplifies the color levels of video signals relevant to an area having a specified brightness level in order to enhance the color of the area. Thus, a strong color is added to displayed video so that the area is conspicuously displayed. Alternatively, the amplifying unit 53 may be omitted so that a natural color is displayed.

In the above-described embodiment, as for color signal processing, the gate unit 52 sets the signal levels of color components of an area other than the area having the specified brightness level to zero so as not to color the other area. Alternatively, the gate unit 52 may suppress the color components of the other area than the area having the specified brightness level so as to add a relatively weak color to the other area. In this case, it is preferable to set the amplifying unit 53 so as not to amplify the signal levels of the suppressed color components of the other area.

In the above-described embodiment, the detachable electronic viewfinder is attached to the imaging apparatus, serving as a video camera, and the electronic viewfinder performs signal processing. Alternatively, the imaging apparatus may perform similar signal processing and the electronic viewfinder may perform color display based on input video signals.

Furthermore, the electronic viewfinder may be incorporated with the imaging apparatus and a signal processing circuit in the imaging apparatus may perform similar signal processing.

FIGS. 4 and 5 illustrate the display examples in which a brightness level is indicated. The indication may be performed in another form.

In the configuration of FIG. 2, hardware for performing respective signal processes is provided and dedicated circuits perform the processes, thus performing desired display. A program for implementing the video signal process shown in FIG. 3 may be provided, video signals obtained by image capture may be temporarily stored into a memory, and similar signal processes may be performed on stored data by executing the program.

The present application contains subject matter related to that disclosed in Japanese Priority Patent Application JP 2008-294879 filed in the Japan Patent Office on Nov. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video display device comprising:
a brightness range specifying unit configured to specify a range of brightness values for highlight;
a signal processing unit configured to detect signals relevant to an area other than an area in the brightness range specified by the brightness range specifying unit from input video signals, suppress color components of the detected signals, and not suppress color components of signals relevant to the area in the specified brightness range;
a display unit configured to display video based on the video signals processed by the signal processing unit, the unit being capable of performing color display; and
an amplifying unit configured to amplify the color components of the video signals output from the signal processing unit, wherein the video signals amplified by the amplifying unit are supplied to the display unit, wherein the color levels of only the color components of signals relevant to the area in the specified brightness range are amplified.

2. The device according to claim 1, wherein video signals indicating the range of brightness values specified by the brightness range specifying unit are superimposed on the video signals processed by the signal processing unit and the resultant video signals are supplied to the display unit.

3. The device according to claim 2, wherein the video signals indicating the range of brightness values specified by the brightness range specifying unit are video signals for performing indication of the range of brightness values specified by the brightness range specifying unit while displaying brightness values in a grayscale in increments or decrements of a predetermined step.

4. An imaging apparatus comprising:
a brightness range specifying unit configured to specify a range of brightness values for highlight;
an imaging unit configured to capture a light image;
a signal processing unit configured to detect signals relevant to an area other than an area in the brightness range specified by the brightness range specifying unit from video signals obtained by image capture through the imaging unit, suppress color components of the detected signals, and not suppress color components of signals relevant to the area in the specified brightness range;
a display unit configured to display video based on the video signals processed by the signal processing unit, the unit being capable of performing color display; and
an amplifying unit configured to amplify the color components of the video signals output from the signal processing unit, wherein the video signals amplified by the amplifying unit are supplied to the display unit, wherein the color levels of only the color components of signals relevant to the area in the specified brightness range are amplified.

5. A method for video display, comprising the steps of:
specifying a range of brightness values for highlight;
detecting signals relevant to an area other than an area in the specified brightness range from input video signals to suppress color components of the detected signals and not suppress color components of signals relevant to the area in the specified brightness range;
displaying video based on the resultant video signals; and
amplifying only the color components of signals relevant to the area in the specified brightness range.

* * * * *